S. STUTZ.
CAR-WHEEL.

No. 173,369.  Patented Feb. 8, 1876.

Witnesses:
Thos. Rask.
Charles West

Inventor:
Sebastian Stutz

UNITED STATES PATENT OFFICE.

SEBASTIAN STUTZ, OF PITTSBURG, PENNSYLVANIA.

IMPROVEMENT IN CAR-WHEELS.

Specification forming part of Letters Patent No. 173,369, dated February 8, 1876; application filed September 11, 1875.

*To all whom it may concern:*

Be it known that I, SEBASTIAN STUTZ, of Pittsburg, in the county of Allegheny and State of Pennsylvania, have invented a new and Improved Car-Wheel; and I do hereby declare that the following is a full, clear, and exact description of the same, reference being had to the accompanying drawing, forming a part of this specification, in which—

Figure 1:
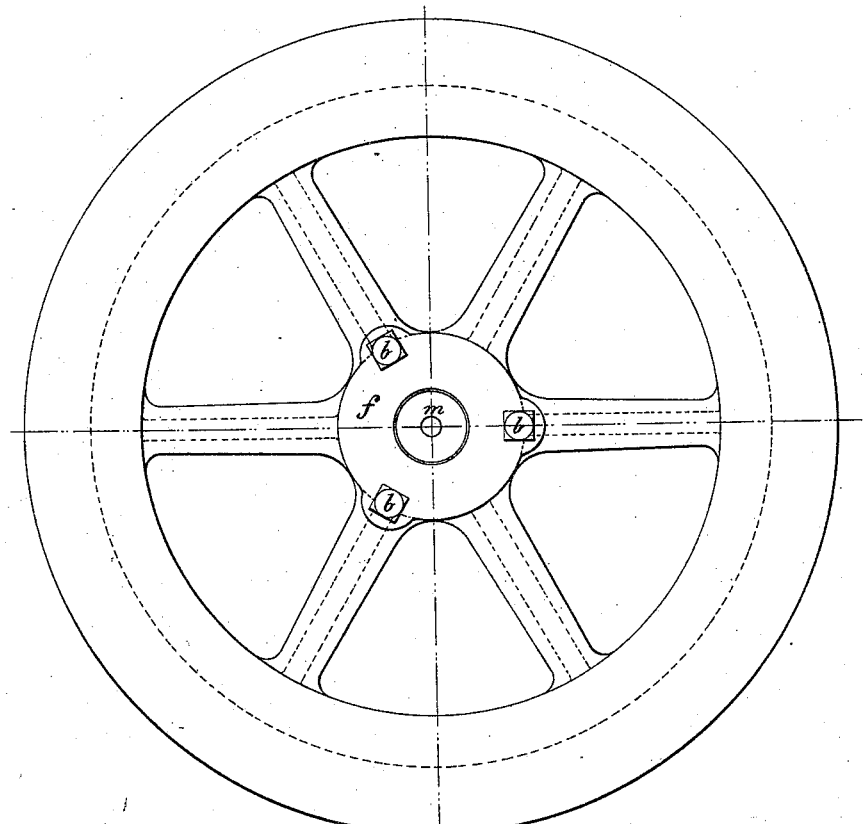
Figure 2:
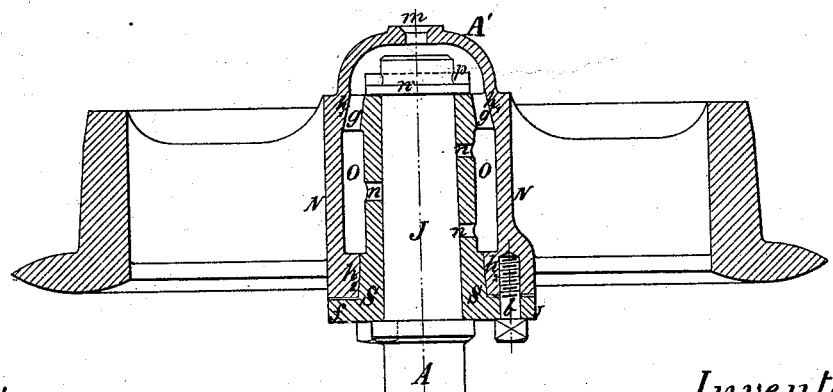

Figure 1 is a side elevation of my improved wheel, and Fig. 2 a central cross-section thereof.

The invention relates to an improvement in the class of wheels which are provided with chambers or cavities for containing a lubricant, and from which said lubricant is fed or distributed to the friction-surfaces of the axle-journal.

The construction of the wheel is as follows: The nave or hub N of the wheel terminates at its outer end in a conical cap, A', which is cast in one piece with the body of the wheel, and provided with a small opening, m, through which the lubricant is introduced into the reservoir O, formed by recessing the inner portion of the hub between the circular ribs or bearing-surfaces h h. Grooves or notches g are cut in the rib h', to permit the lubricant (inserted through the hole m) to find access to the said annular chamber or reservoir O.

Openings n are formed in the sleeve or box S, to permit access of the lubricant from reservoir O to the journal J. The rear or inner end of the sleeve S has a radial flange, f, and the hub N is secured thereto by means of bolts b, as shown. The sleeve is, in turn, secured to the axle-journal J by means of a screw-nut, or, as shown, by a pin, p, and washer n', and thus the wheel itself is held in place on the axle A.

The reservoir O and cap A' may be nearly half filled with the lubricant, and the hole m may also be closed with a plug to exclude dust or other foreign substances.

By constructing journal-box and hub, and connecting them in the manner shown and described, I secure freer circulation and access of oil to the journal, and adapt the wheel to be removed from the axle with greater convenience.

I do not claim a car-wheel provided with a detachable cap or oil-cup, nor the employment of a perforated journal-box in connection therewith; but

What I claim is—

1. The combination, with the hub N, having chamber O and oil-passages g in its front inner bearing h, and the oil-holding cap A', of the box S, having the perforations n, all as shown and described, whereby the lubricant has free circulation around said box and access to the journal, as specified.

2. The combination, with the hub N, of the journal-box S, having radial flange f, and the screw-bolts b, as shown and described, for the purpose specified.

SEBASTIAN STUTZ.

Witnesses:
THOS. RASK,
CHARLES WEST.